United States Patent Office 2,938,925
Patented May 31, 1960

2,938,925

2-(ALPHA-NAPHTHYL)-1,3-DIKETOHYDRINDENE

Darius Molho, Ecully, France, assignor to Lipha, Lyon (Rhone), France, a company of France No Drawing. Filed June 10, 1954, Ser. No. 435,912

Claims priority, application France June 18, 1953

1 Claim. (Cl. 260—590)

A number of derivatives of hydroxy-4 coumarine have been described as rat-killing agents by reason of their property of lowering the rate of prothrombin in the blood of the rats which have ingested them (Klausmann, Veterinary Medicine, Report of a Series of Deliberate Warfarine Poisonings; June 1952, p. 235, Bervoets and Damn Ann. Soc. Belge Med. Tropic. 30, IV, 1952, 113).

Now it has been found, in accordance with my invention, that the aryl-2 indane diones 1-3 described hereinafter are bestowed with similar properties.

Now, I have found that the particular aryl 2 indane diones 1-3, where the aryl substitution product is a phenyl radical with the substitution of at least one substituent in its ring, form products which when given to rats, mice, field mice, either pure or admixed with bran, meal, grains, an inert excipient or even a liquid so as to form a poisonous bait, are capable of destroying these objectionable rodents.

The rats which have eaten such baits or have absorbed such products spread over their usual passageways, lose their appetite, keep away from the place where such a treatment has been executed, go to ground and die as a sequel to internal haemorrhagia.

The interest of these novel aryl 2 indane diones 1-3 resides in their selective anti-coagulant properties. While lowering the rate of prothrombin in rats down to values so small (less than 1%) that the least traumatism (a bite or an excoration) becomes deadly, they act also on human beings and domestic animals (such as dogs, pigs, etc.) but only by a transient lowering of the rate of prothrombin by values of the magnitude of 30%. Consequently, such novel products cannot lead to a danger of haemorrhagia for human beings and domestic animals, although they are deadly for objectionable rodents.

The derivatives proposed according to my invention may, however, be used for human therapy in the general treatment of thrombosis, whether as a preventive or as a curative treatment.

My invention covers thus the application, for rat-killing purposes with a view to destroying objectionable rodents and as a medicine for human beings, of the following group of novel aryl-2 indane diones 1-3:

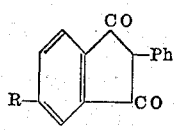

wherein R designates hydrogen or $NO_2$ while Ph designates an aryl radical which may be either a phenyl radical with the substitution of one or more halogen atoms (Cl, Br, I) or else, a phenyl radical with the substitution of one or more alkyl or hydroxyalkyl groups or a phenyl radical with the substitution of one or more groups $NO_2$ or an α or β naphthyl radical with the possible substitution of one or more halogen atoms or of alkyl, hydroxyalkyl or $NO_2$ groups.

My novel aryl-2 indane diones 1-3 are prepared through conventional methods which may be briefly summarized as follows:

According to a first method, a diacid anhydride such as phthalic anhydride is condensed with an arylacetic acid in the presence of sodium acetate, the product obtained, which is an arylidene phthalide (see Gabriel and Neuman, Berichte Deut. Chem. 26, 953, 1893), being then transformed into an aryl-2 indane dione 1-3 by heating in the presence of sodium methylate (see Nathanson, Berichte Deut. Chem. 26, 2576, 1893).

It is also possible, according to a second method, to produce a direct condensation between the phthalide and an aromatic aldehyde in the presence of sodium methylate (see Diekmann Ber. Deut. Chem. 47, 1439, 1914).

Again it is possible to produce a condensation between a nitrophthalide and an aromatic aldehyde in the presence of piperidine, the arylidene phthalide being then transformed as in the first case into aryl-2 indane dione 1-3 in the presence of sodium methylate (see Borsche and Coll, Ber. Deut. Chem. 67, 680, 1934).

My invention will be better understood through the following examples of preparation and use of my novel products:

EXAMPLE 1

(α Naphthyl)-2 indane dione 1-3

$C_{19}H_{12}O_2$

The preparation through the first above described synthesis method is as follows:

3 grams of α naphthyl acetic acid are intimately admixed with 3 grams of phthalic anhydride. 0.1 gr. of acetate of sodium or of potassium are added in a molten state and the whole mass is poured over a steam bath into a bulb with an open neck. When the mass is molten, the inner temperature of the bulb is brought to 240° C., the molten mass rises, droplets of water appear and carbon dioxide is released. The heating is continued by stirring with a spatula for two hours. Upon cooling, boiling water is used for removing the alkaline acetate and the excess of α naphthylacetic acid or of phthalic anhydride. The mass is then drained and allowed to crystallize in alcohol. I obtain thus 3 grams of α naphthylidene phthalide $C_{19}H_{12}O_2$ (melting point 165° C.) which is transformed into α naphthyl-2 indane dione 1-3 as follows: 0.23 gram of Na or 0.39 gram of K are dissolved in 30 cub. cm. of methyl or ethyl alcohol. There are then added 2.72 grams of α naphthylidene phthalide and the whole mass is submitted to reflux conditions until total dissolution is obtained, say during one half hour. The red solution obtained is treated by 4 times its volume of water and acidified by HCl. An abundant precipitate appears which is submitted to further crystallization in acetic acid (melting point 216° C.—yield: 2.60 gr.).

EXAMPLE 2

(β Naphthyl)-2 indane dione 1-3

$C_{19}H_{12}O_2$

The preparation is performed in accordance with the first synthesis method. The method is the same as in the case of Example 1, starting from 3 grams of phthalic anhydride and 3 grams of β naphthyl acetic acid. The β naphthyl-2 indane dione 1-3 melts at 180° C. and forms yellow needle-like crystals.

EXAMPLE 3

(α Naphthyl)-2 indane dione 1-3

$C_{19}H_{12}O_2$

The preparation is performed in accordance with the second method: $1/10$ of a molecule of anhydrous phthalide prepared in accordance with Reissert's method (Ber. 46, 1489–1913) is admixed with 1/10 of a molecule of α naphthoic aldehyde. The mass is molten and there is added thereto an anhydrous alcoholic solution containing 1/10 of a molecule of methylate of sodium or potassium. It is then treated for half an hour under reflux conditions. The blood-red solution treated with water is submitted to extraction through ether so as to remove the non-saponifiable material, after which the aqueous solution is acidified with HCl. After recrystallization in acetic acid, the α naphthyl-2 indane dione 1-3 obtained (melting point 216° C.) shows no lowering of its melting point when mixed with a sample of the same derivative obtained through the method disclosed in Example 1.

EXAMPLE 4

(Chloro-4' phenyl)-2 indane dione 1-3

The operation is the same as in the case of Example 3, and the mixture of 1/10 of a molecule of parachlorobenzaldehyde with 1/10 of a molecule of phthalide is treated by 1/10 of molecule of sodium methylate; after recrystallization in alcohol, white needle-shaped crystals are obtained, the melting point of which is 141° C.

EXAMPLE 5

(Methoxy-2' phenyl)-2 indane dione 1-3

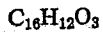

The preparation is the same as in the case of Example 3, starting with orthomethoxybenzaldehyde and phthalide; cream-coloured needle shaped crystals are obtained through crystallization in alcohol, the melting point of the product being 167° C.

EXAMPLE 6

(Methoxy-3' phenyl)-2 indane dione 1-3

The preparation is the same as in the case of Example 3 starting with metamethoxybenzaldehyde and phthalide. The final product crystallizing in alcohol forms cream-colored needle-shaped crystals and has a melting point of 148° C.

EXAMPLE 7

(Dimethoxy-2'-4' phenyl)-2 indane dione 1-3

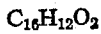

The preparation is the same as in the case of Example 3 starting with dimethoxy 2–4 benzaldehyde and phthalide; the product crystallizing in alcohol has a melting point of 186° C.

EXAMPLE 8

(Methylenedioxy 3'-4' phenyl)-2 indane dione 1-3

Prepared as in the case of Example 3, starting with methylenedioxy 3-4 benzaldehyde and phthalide. Melting point of the product crystallizing in alcohol: 159° C.

EXAMPLE 9

(Trimethoxy 3'-4'-5' phenyl)-2 indane dione 1-3

Prepared as in the case of Example 3, starting with trimethoxy 3-4-5 benzaldehyde and phthalide. Melting point of the product crystallizing in alcohol: 183° C.

EXAMPLE 10

(Methoxy-4 methyl-2 phenyl-2 indane dione 1-3)

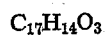

Prepared as in the case of Example 3 with methyl-2 methoxy-4 benzaldehyde and phthalide. Melting point of the product crystallizing in acetic acid: 160° C.

EXAMPLE 11

(Methoxy-2' bromo-5' phenyl)-2 indane dione 1-3

Prepared as in the case of Example 3 with methoxy-2 bromo-5 benzaldehyde and phthalide. Melting point of the product crystallizing in acetic acid: 162° C.

The various aryl-2 indane dione 1-3 referred to hereinabove may serve as rat killers.

EXAMPLE 12

A suspension of α naphthyl-2 indane dione 1-3 admixed with oatmeal at a concentration of 0.1% is spread in the passageways used by the rats i.e. at the points where their excrements are found. After a few days, the rats have disappeared from the place at which the product has been spread.

The product may also be admixed with crushed bread or again in the form of a paste. I may also prepare an aqueous solution of aryl-2 indane dione 1-3 in soda such that its pH is equal to 10 and in this solution wheat grains are soaked during a few hours while the solution is stirred from time to time.

The different aryl-2 indane diones 1-3 may also be used for human therapeutic purposes.

EXAMPLE 13

Tablets of 50 mg. of α naphthyl indane dione are given to women after child-birth with a view to removing the risk of obstetrical phlebitis at the rate of 4 tablets the first day, 2 the next and 1 tablet on the third day.

The coefficient of coagulation of the blood is checked daily on citrated plasma by executing measurements of the duration of coagulation and of Quick's time (Am. J. Clin. Path. 15, 560—1945). The results obtained measured in rates of prothrombin show that the latter has dropped after 24 hours from 100 to 50%; after 48 hours, it has dropped to 30%, the figure being the same after 36 hours.

As soon as the treatment has stopped, the rate of prothrombin rises gradually back to its normal rate and after 72 hours, it has reached its initial value of 100%. The α naphthyl indane dione 1-3 forms the object of but little individual sensitiveness, but in the exceptional case of hypersensitivity, the antidotes are as follows: large doses of vitamins K or blood transfusion.

The above example is obviously given by no means in a limiting sense either as concerns the doses or the therapeutical indications and all thromboses such infarctus myocardii, may be treated by the above novel aryl-2 indane diones 1-3 and in particular through the α naphthyl 2 indane dione 1-3.

What I claim is:
2-(alpha-naphthyl)-1,3-diketohydrindene.

References Cited in the file of this patent

S. Gabriel: Ber. Deut. Chem. 18, 3470 (1885).
F. Nathanson: Ber. Deut. Chem. 26, 2576 (1893).
Koelsch, J. Am. Chem. Soc. 58, 1329 (1936).
Frank et al.: C.A. 38, column 965 (1944).
Kabat et al.: Jour. of Pharm. and Exptl. Therapeutics, vol. 80, pages 160 to 170 (February 1944).
Burger: Medicinal Chemistry, vol. I, page 264 (1951).
Kodama: Chem. Abstracts, vol. 45, col. 5169c (1951).